Dec. 15, 1964  J. R. MORDEN  3,161,214
SHEET MATERIAL DRILLING EQUIPMENT
Filed March 14, 1961  5 Sheets-Sheet 1

INVENTOR
JOHN R. MORDEN
BY
Symmestvedt & Lechner
ATTORNEYS

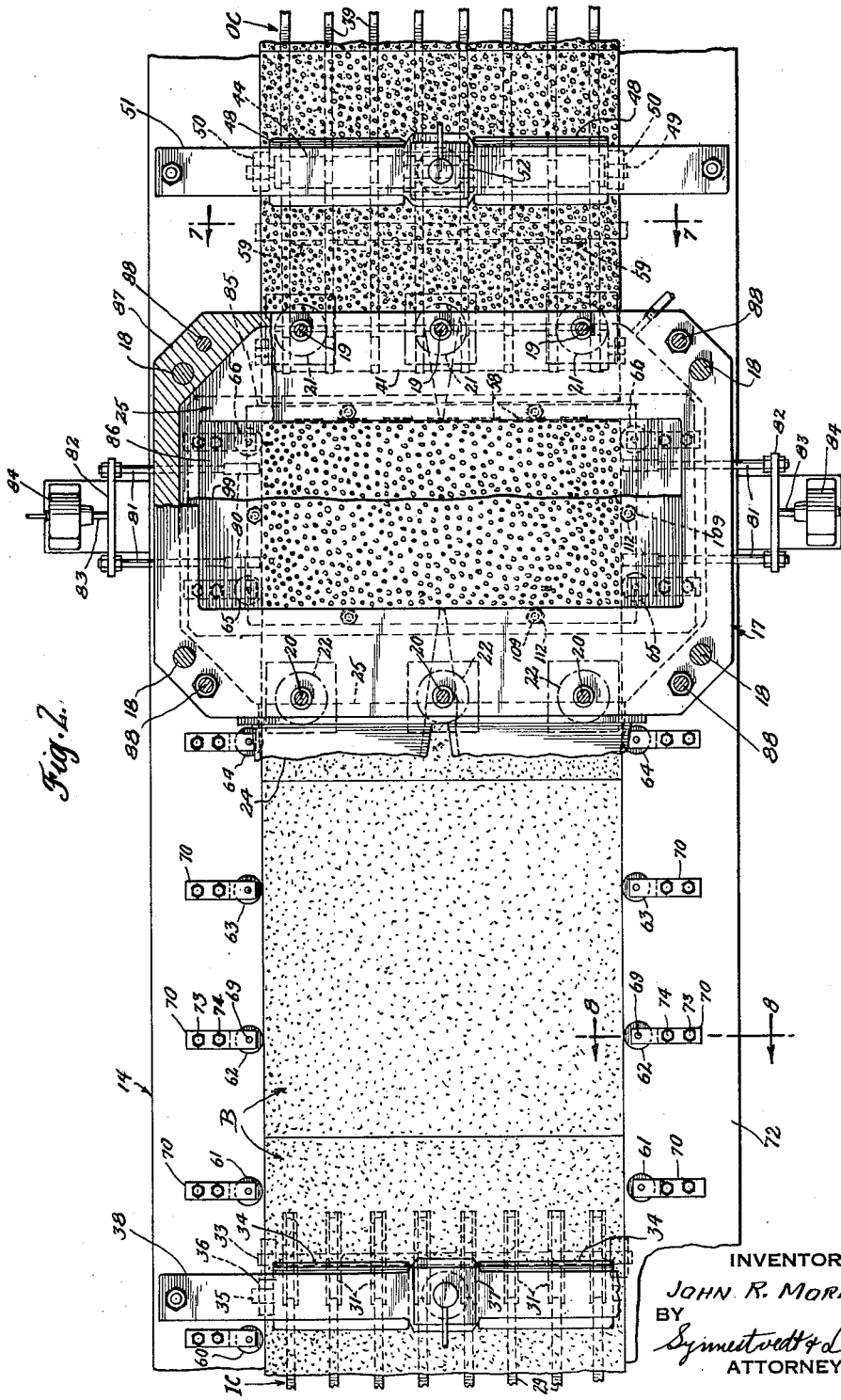

Dec. 15, 1964   J. R. MORDEN   3,161,214
SHEET MATERIAL DRILLING EQUIPMENT
Filed March 14, 1961   5 Sheets-Sheet 3
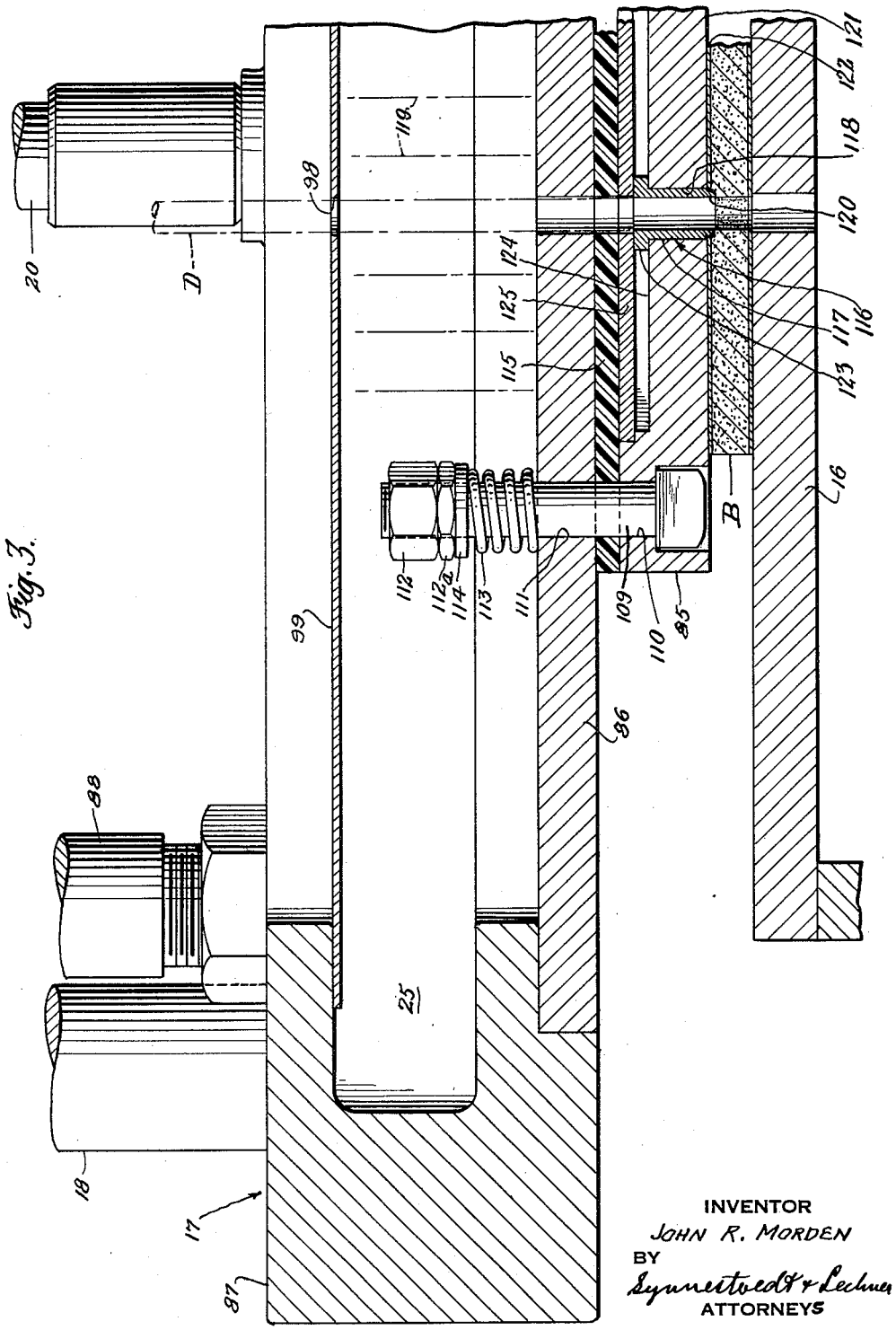
INVENTOR
JOHN R. MORDEN
BY
Synnestvedt & Lechner
ATTORNEYS

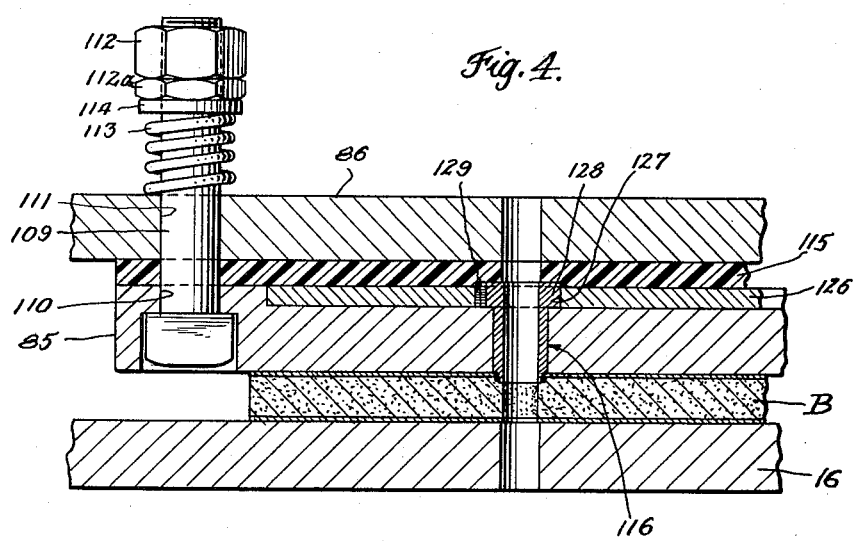
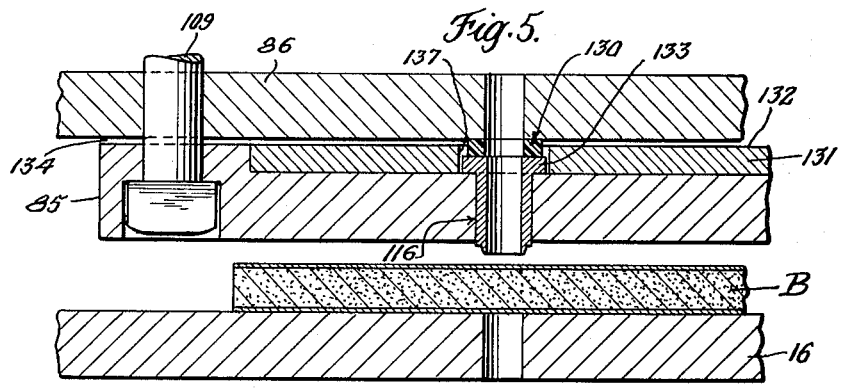
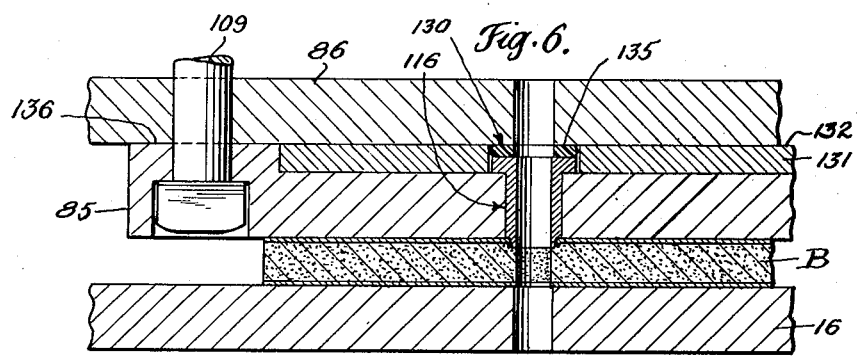

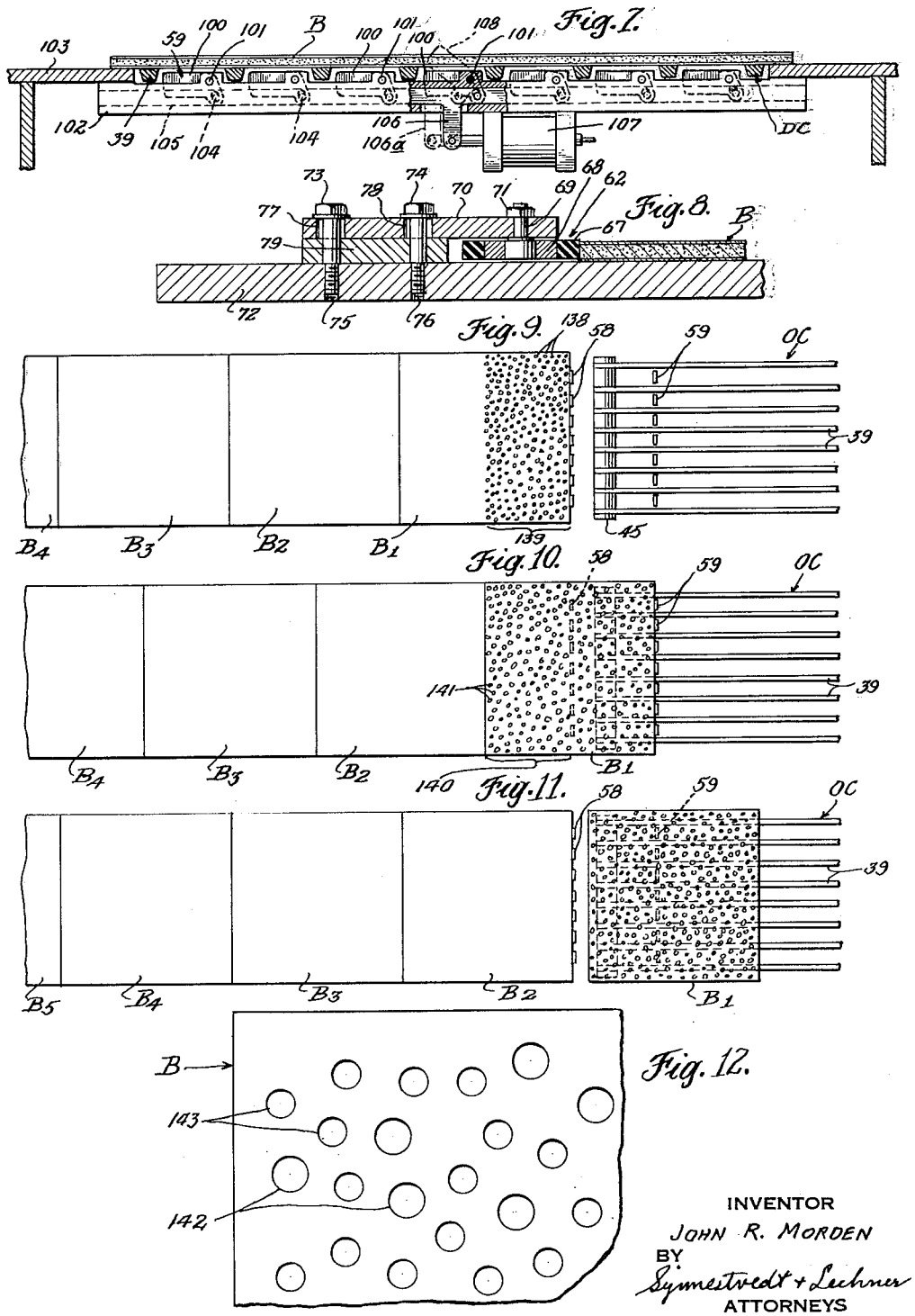

United States Patent Office 3,161,214
Patented Dec. 15, 1964

3,161,214
SHEET MATERIAL DRILLING EQUIPMENT
John R. Morden, West Chester, Pa., assignor to Bestwall Gypsum Company, Ardmore, Pa., a corporation of Maryland
Filed Mar. 14, 1961, Ser. No. 95,688
8 Claims. (Cl. 144—110)

This invention relates to equipment for forming a multiplicity of apertures in a sheet of material. More specifically, the invention relates to the gang drilling of a large number of holes through a sheet of set gypsum board to be used as an acoustic tile.

Gypsum board has numerous advantageous properties, such as, desirable hardness and strength, fire resistance, and resistance to warping due to aging or thermal or moisture conditions, which make it highly desirable as a material for acoustic tile.

Set gypsum boards are customarily formed with a sheet of paper bonded to each side. Since such gypsum board has a relatively smooth and continuous surface, it is necessary to have a multiplicity of apertures in the board in order to provide desirable sound-absorptive capabilities.

When a sheet of gypsum board is provided with a multiplicity of holes passing completely therethrough, and when such apertured board has a thin membrane or sheet of paper or plastic laminated to the back surface thereof, there results an acoustic tile having highly desirable acoustic properties but also having the above-mentioned structural and fire-resistant special properties of the gypsum board itself.

Heretofore, according to various prior art techniques, it has been attempted to form acoustic tile from gypsum board but all such prior art techniques have not been satisfactory for one reason or another.

One prior art technique involves the casting of gypsum in a mold such as to form a multiplicity of holes in the gypsum. This technique has been unsuccessful for a number of reasons. Gypsum formulations susceptible to such molding or casting operations result in a set gypsum cast having severe strength limitations. As a result, acoustic tile made by such prior technique is quite brittle and friable. The normal handling necessary to package, ship and install the cast tiles results in the fracturing or chipping of a substantial proportion thereof. Furthermore, even if the cast tiles are successfully installed intact, jarring or bumping by a hard object may often result in fracturing the installed tile.

Despite endeavors to surmount the problems encountered in attempts to cast apertured acoustic tile, such tile has not been successfully commercially produced or used.

Another prior technique attempted to be used to form acoustic tile from gypsum board involves punching the holes simultaneously. However, such punching, when effected according to the prior art, has been only moderately successful and has involved a quite substantial percentage of imperfect and rejected tile.

The crushable nature of the material leads to a tendency for the holes punched to be ragged or uneven and for the edges of the punched holes to be not sharp and straight, as is desirable and attractive, but rather ragged, with portions crushed and weakened.

The special problems encountered in efforts to punch apertures in gyypsum board are compounded by the fact that heretofore it has been impossible to intimately and firmly hold the surface of gypsum board in the area immediately surrounding each punch when a multiplicity of punches are simultaneously used. In connection with this difficulty attention is called to the following.

By even the most modern and carefully controlled gypsum board manufacturing techniques it is still not possible to produce gypsum board having exactly planar surfaces and of exactly uniform thickness. On the contrary, the gypsum boards vary in thickness very slightly and are prone to have a slightly wavy surface. Such irregular and unpredictable variations of the board surface from the planar give rise to special problems, not only with respect to punching operations of the kind discussed above, but also with respect to drilling operations discussed below.

Since an acoustic tile of convenient size, for example two feet square, desirably has 1500–1800 apertures, it is impossible to successfully commercially produce acoustic tile by an operation involving an individual and sequential drilling or punching of each of the apertures. Instead, it is a commercial, absolute requirement that a large number of the apertures be formed simultaneously so that all the required apertures can be formed in perhaps one, two, three, or four steps.

It thus becomes necessary to utilize a gang drill or gang punch of some sort. Since it is highly desirable to avoid any shredding of the paper facing around the holes, it is necessary to provide, in a ring around the hole to be formed, means pressed firmly against the paper of the board. The prior art has encountered severe difficulties in solving the problem of firm edge pressure around each aperture.

A plate having the required number (for instance 700 or 800) of closely spaced rings or collars extending therefrom is difficult to manufacture so that each of the rings protrudes from the surface of the plate exactly the same distance. Furthermore, even if a plate having the required number of rings evenly protruding therefrom is successfully manufactured, pressing the plate to the surface of the board will not bring about the desired result. Some of the rings contact the board in the region of a "hill" in the surface thereof while others do so in the region of a "valley". Those in the valleys do not firmly contact the paper of the board and thus do not hold the paper against shredding around the edges of the holes during the hole-forming operation.

It is here pointed out that gypsum board presents a unique problem in this regard because of its unusual hardness and brittleness. Many other sheet materials used for acoustic tile are, at least to some degree, resilient. Substantially uniform contact of all the rings of a plate of the kind described can thus be accomplished by applying considerable pressure urging the plate toward the sheet. Such pressure results in forcing the rings resting on the hills to deform the material and indent themselves into it to a depth sufficient to bring the rings over the valleys into tight contact with the sheet.

However, when a plate of the kind just described is pressed against a sheet of gypsum board the application of pressure does *not* bring all of the rings into tight contact with the gypsum board. The application of sufficient pressure to result in the indentation of some of the rings into the board simply results in a crushing of the board. The application of pressure less than enough to force some of the rings into the board is ineffectual to close the minute space between the rings and the valleys in the board.

The characteristics of the paper customarily and desirably used for facing gypsum board aggravate the problem of forming cleanly sheared holes. Factors related to the strength, flexibility, thickness, moisture-absorptive properties, cost, etc., normally lead to the selection of paper having relatively long fibers and a rather soft texture and surface. When an aperture-forming device is passed through a board faced with such paper, there is a tendency for the fibers in the region of the edge of the aperture to pull apart in a rather ragged fashion. The fibers remaining in the sheet immediately around the aperture tend to follow the aperture-forming device down into the aperture and this tendency also leads to a ragged edge. Drilling operations, which involve a rotating cutting surface, are more likely to accomplish a clean cutting or shearing of the fibers than are straight punching operations. However, when the drills are advanced axially at a reasonably rapid rate, the cutting action involved is more like a rotating punch and less like a drill.

It will be seen from the foregoing analysis, that the problems of simultaneously holding the edges of the paper around a multiplicity of aperture locations exist both with respect to attempts to punch holes in gypsum board and also with respect to attempts to drill the board by gang drills of the kind used to drill acoustic tile formed from other materials. As a result, yet another prior art technique, gang drilling, has proved to be unsatisfactory for making acoustic tile from gypsum board.

Molding, gang punching and gang drilling of gypsum board have all been attempted but have never been successfully commercially used. As a result, the gypsum board industry has been, up to the present time, unable to introduce its gypsum board product into the acoustic tile field.

The present invention provides a technique for tightly holding the paper around each of the multiplicity of aperture-forming devices so that a multiplicity of apertures can simultaneously be formed. The invention makes possible, for the first time, the commercial production of acoustic tile from gypsum board.

The primary object of the present invention is the provision of equipment and method whereby a multiplicity of apertures can be simultaneously formed in gypsum board.

Another object of the invention is the provision of equipment for yieldingly and simultaneously urging a multiplicity of paper-holding ring devices into individual, intimate contact with the surface of a sheet of gypsum.

Still further, the invention has as an object the provision of special-holding means to firmly hold a gypsum tile during an aperture-forming operation, such holding of the tile being three dimensional.

Still further, an object of the invention is the provision of a multiplicity of individual bushings through which the drills of a gang drill can travel into a sheet of material to be drilled, the bushings being yieldingly pressed against the sheet by means of resilient backing means made from a material capable of substantial elastic deformation. Accordingly, the bushings can individually assume positions in which they extend toward the sheet to be drilled a distance exactly sufficient to result in intimate pressure contact between the bushing and the sheet.

How these and other objects and advantages are attained will be seen from the following description taken with the accompanying drawings in which:

FIGURE 2 is a plan view, partly in section, taken generally along the line 2—2 of FIGURE 1 and on an enlarged scale as compared to FIGURE 1;

FIGURE 3 is a fragmentary sectional elevation, on an enlarged scale, illustrating one floating bushing according to the invention, together with various associated parts;

FIGURE 4 is a fragmentary sectional elevation similar to FIGURE 3 and showing another embodiment of the invention;

FIGURE 5 is a fragmentary elevation similar to FIGURE 4 but showing yet another embodiment of the invention this view showing the parts before the application of assembly pressure;

FIGURE 6 is a view of the parts of FIGURE 5 after the application of assembly pressure;

FIGURE 7 is a fragmentary front elevation taken generally along the line 7—7 of FIGURE 2;

FIGURE 8 is a fragmentary elevation taken generally along the line 8—8 of FIGURE 2;

FIGURE 9 is a diagrammatic plan view showing a series of acoustic tiles with the first such tile having a multiplicity of holes drilled in the leading half thereof;

FIGURE 10 is a view similar to FIGURE 9 showing the first tile advanced in the apparatus and having a multiplicity of holes drilled in the trailing half thereof;

FIGURE 11 is a view similar to FIGURE 10 showing the first tile in position to exit from the drilling station and showing another tile in position for drilling; and FIGURE 12 is a fragmentary view of a corner of an acoustic tile drilled according to the present invention.

Figure 1:
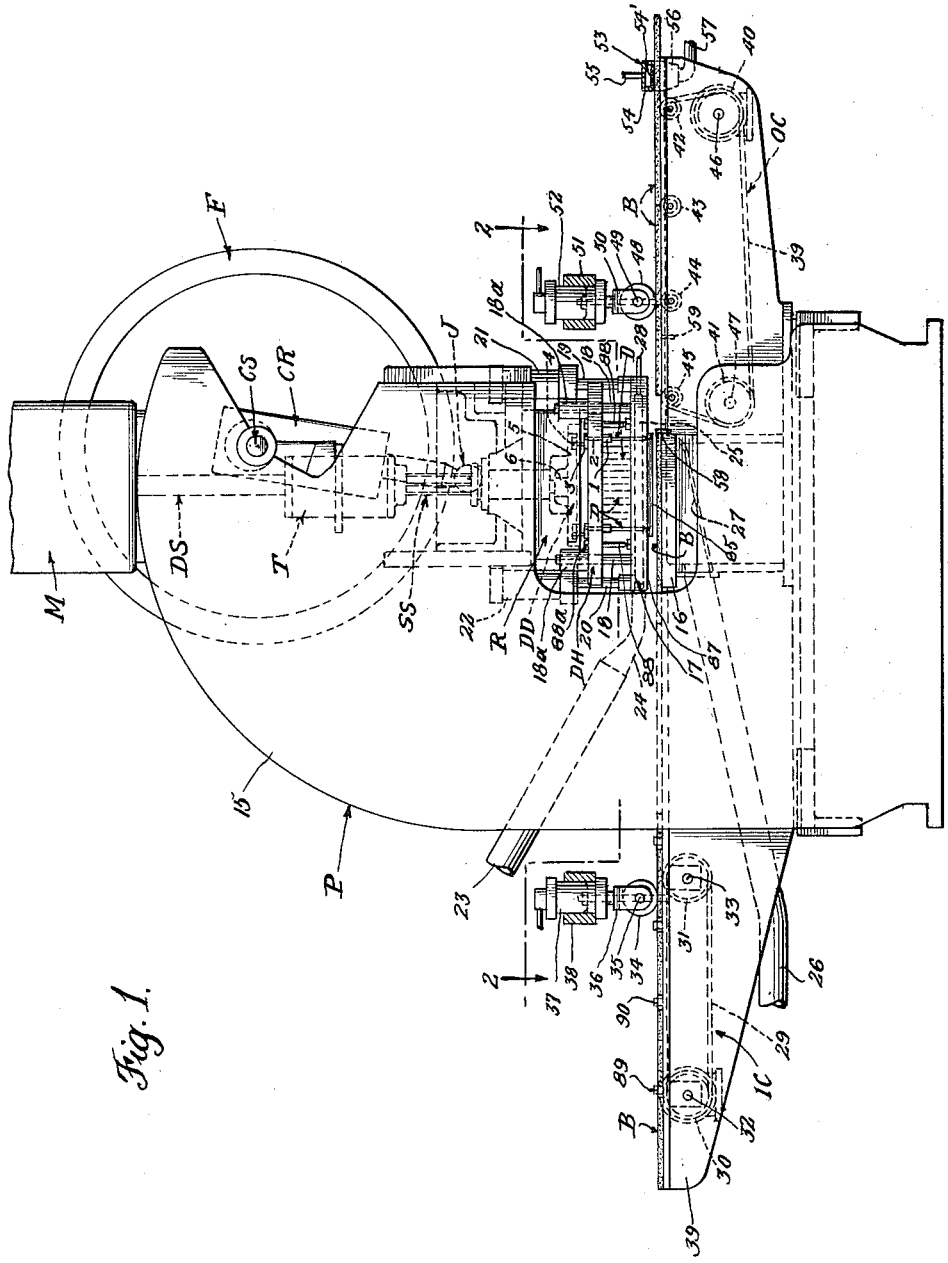
FIGURE 1 is a side elevation of drilling mechanism incorporating the invention.

Referring to the drawings generally, the press P includes a drill head DH from which the drills D protrude downwardly, the drill head DH being carried by the reciprocating ram R which travels up and down as the flywheel F rotates on crank shaft CS and actuates connect-rod CR interconnected with the ram R by the ball and socket joint J. During reciprocation of the drill head DH, the drills are rotated by the drill motor M by means of the drive shaft DS, speed control transmission T, the spline shaft SS, and the gearless drill drive DD.

The gypsum boards B to be drilled are fed into the apparatus by the input conveyor IC and are fed out of the apparatus by the output conveyor OC.

Before describing the drawings in detail, it is here mentioned that the special sheet-holding means of the invention, hereinafter sometimes referred to as the "floating bushings," can advantageously be used with press, conveyor, and aperture-forming devices of various kinds. The equipment surrounding the floating bushings of the invention is illustrated for a typical installation and is shown and described in considerable detail so as to make entirely clear the structure and operation of the equipment and method of the invention.

Attention is first directed to the parts as seen in FIGURE 1. The press P includes a press frame 15 which is placed on a firm foundation and which supports the rest of the equipment.

A bed plate 16 is provided in position below the ram of the press. The bed plate supports the tile during the formation of apertures therein. The bed plate is provided with a plurality of apertures with one aperture concentric with each of the drills.

The head plate 17 is apertured in the same manner as the bed plate so that the drills D may pass through the head plate 17, the sheet of material between the head plate and the bed plate, and protrude into the apertures in the bed plate.

The head plate assembly 17 has, secured thereto, upstanding guide posts 18 which pass through the drill head DH and through the bearing sleeves 18a secured to the upper side of the drill head DH. The drill head DH and associated bearing sleeves 18a are free to slide up and down on the guide posts 18. The extent of the relative motion between the head assembly 17 and the drill head DH is limited by means of the tie rods 88 described below.

The head plate assembly 17 is reciprocated by the piston rods 19 spaced along the front edge of the head plate and the piston rods 20 spaced along the rear edge, which piston rods 19 and 20 are actuated by pressure fluid in the cylinders 21 and 22, respectively.

The drills D may be rotated in any convenient way, for example, by means of what is known in the art as a "gearless drive" DD. In FIGURE 1 just two drills D are illustrated, one on the right-hand side of the group of drills, and one on the left-hand side. The large number of drills which are mounted between the right and left drills illustrated are indicated by a series of parallel vertical dashed lines. Each drill D is screwed into a short sleeve 1 which has a pin 2 screwed into the upper end thereof. Each pin 2 passes through an aperture in the drill head DH and its upper end is secured to the crank arm 3. Pin 4 extends upwardly from crank arm 3 in a position eccentric to that of the pin 2. Each pin 4 extends into a recess in wobble plate 5 which is driven by the eccentric 6 rotated by spline shaft SS. The wobble plate 5 thus acts as a crank member rotating each crank 3 about the axis of the downwardly extending pin 2 to which a drill D is secured.

Suction conduit 23 interconnects, via the fitting 24, with a chamber 25 in the head plate so that drilled debris carried upwardly by the drills is collected and sucked away from the apertures. Similarly, suction conduit 26 communicates with the debris-collection manifold 27 in the bed plate and sucks debris out of the drilled holes from below. Air under pressure may be supplied to the debris-collection chamber 25 by any convenient means, for example, through the air supply line 28.

The input conveyor means IC includes a plurality of V belts 29 running over pulleys 30 and 31 mounted for rotation on shafts 32 and 33, respectively. A power drive is connected to either of the shafts 32 and 33 so as to actuate the pulley and belt assembly in direction such as to tend to feed boards resting on the belts toward the press P.

The rollers 34 are mounted for rotation on shaft 35 carried in brackets 36 mounted above the V belts 29. The brackets 36 are adapted to be moved up and down, for example by means of the pneumatic or hydraulic piston and cylinder device 37, to bring the rollers 34 into contact with a sheet on the conveyor or to retract the rollers out of such contact. The assembly of rollers 34, shaft 35, brackets 36 and piston and cylinder device 37 is conveniently mounted by means of cross arms 38 secured to frame members 14 extending from the frame 15 of the press P (see FIGURE 2).

The output conveyor OC includes a plurality of V belts 39 traveling over large pulleys 40 and 41 and small pulleys 42, 43, 44 and 45. The belts 39 are driven by the application of a rotative force to either the shaft 46 or the shaft 47 on which the pulleys 40 and 41 are mounted.

Exit rollers 48 are mounted on shaft 49, brackets 50 and cross bar 51 in a manner similar to that described just above in connection with rollers 34, and piston and cylinder device 52 is positioned on cross bar 51 to move the rollers 48 downwardly toward a board on the belts 39 or upwardly away from such board.

A cleaning device 53 is preferably provided just beyond the exit from the belts 39, such device conveniently taking the form of a supply manifold 54 extending across the unit and supplied with air under pressure through connection 55. The manifold 54 has a plurality of holes 54' in the lower face thereof through which air may pass. The air exiting from the holes 54' passes through the holes drilled in the board and, together with any dust or debris from the drilling operation, enters the exit manifold 56 from which it is sucked away through conduit 57.

Stop means 58 and 59 are arranged for controlled motion between a "stop" position in which they protrude into the path of travel of the boards passing through the equipment and arrest the motion thereof, and a "go" position in which the stop means are retracted out of the path of travel of the boards. The operation of the stop means is automatically integrated with the action of the drills and head plate so that the boards are successively arrested first in position to have holes drilled in the leading portions thereof, and second to have holes drilled in the trailing portions thereof.

It is here mentioned that the boards are positively advanced through the device, even in the central region in which the board has left direct contact with the input conveyor IC and has not yet come into direct contact with the output conveyor OC. This is accomplished by a pushing action of one board against the other so that the board actually being directly advanced by the input conveyor IC pushes on another board which, in turn, pushes on another board, and so forth. Eventually the point is reached at which the advance of each board is further and rapidly accomplished by direct contact with the output conveyor OC.

As best seen in FIGURES 2 and 8, pairs of guide rollers 60, 61, 62, 63, 64, 65 and 66 are provided in opposed relation to the sheets traveling through the device. One of the rollers of the pair 62, 62 is illustrated in section in FIGURE 8. As there seen, each roller includes a rubber peripheral portion 67 mounted on a metal wheel 68 which is mounted for rotation on the axle 69 which passes through bracket 70 and is secured in position by nut 71. The roller is free to rotate. The bracket 70 is secured to the base 72 by studs 73 and 74 which screw into tapped holes 75 and 76, respectively. The studs 73 and 74 pass through adjusting slots 77 and 78 in the bracket 70 so that the position of the bracket, and therefore of the roller 62, can be adjusted toward and away from the sheet B. The spacer 79 is interposed between the bracket 70 and the base plate 72 and maintains clearance for free rotation of the roller 62.

It will be seen from FIGURE 2 that the pairs of rollers toward the input side, that is rollers such as 60 and 61 (and the pairs of rollers 89 and 90, as seen in FIGURE 1, which are earlier in the path of board travel than the rollers 60 and 61) are desirably spaced apart slightly more than the rollers toward the center of the apparatus, that is, rollers such as 64, 65 and 66. By this means the sheets B are firmly guided into exactly the desired path of travel through the apparatus. Various prior devices have generally involved guide tracks or rails running continuously along the sides of the path of travel of the sheets. While such rails are satisfactory for the guiding and positioning of sheets of many different kinds of materials, they are not satisfactory for gypsum board because of the tendency for the gypsum to rub off on the track and build up thereon a hard layer which then tends to jam the operation.

In equipment according to the invention, it is especially necessary to provide exactly accurate transverse positioning of the sheets prior to the assumption of a position beneath the gang drill. Variations in the transverse positioning will result in the drilling of holes in varying positions in the sheet. Such changes in regularity impair the attractiveness of the finished tile. For this reason, the guide rollers just described and shown in FIGURES 2 and 8 are an important aspect of the invention.

When a drilling operation has been completed and the drill head is retracted upwardly out of contact with the sheet, the suction applied to the sheet from below by means of the suction conduit 26 tends to hold the sheet in position even beyond the time at which it is desired to move the drilled sheet forward. As an aid in breaking such suction and permitting the board to advance, the chisel-shaped fingers 80 are mounted along the sides of the board. The fingers 80 are secured to shafts 81 mounted on the cross bar 82 secured to the piston shaft 83 actuated by the piston and cylinder device 84. Thus, when it is desired to advance a sheet, the piston and cylinder devices 84 shove the chisel fingers 80 toward the sheet from both sides. The chisel fingers 80 ride under the edges of the sheet and lift the sheet upwardly so that the suction on the sheet is relieved.

As seen in FIGURES 2 and 3, the head assembly 17 includes a face plate 85 secured to the bottom side of the pressure plate 86 which is carried by the frame 87. As mentioned above, the head assembly 17 and drill head DH are mounted for some freedom of motion with respect to each other. More specifically, the drill head DH can continue to move in a downwardly direction even after the head assembly 17 bottoms on the sheet to be drilled, such motion of the drill head DH being accommodated by means of the guide posts 18 and bearing sleeves 18a described above. During motion in the opposite sense, that is, during upward motion of the drill head DH and head assembly 17, the degree of relative separation between the drill head and head plate is limited by means of the tie rods 88 which are secured in upright position to the upper side of the head assembly 17. These tie rods 88 pass through apertures in the drill head DH, and are threaded at the upper end to cooperate with nuts 88a. Separation of the drill head DH and the head assembly 17 is stopped when the nuts 88a abut the upper surface of the drill head DH. The degree of separation permitted can be adjusted by changing the position of the nuts 88a.

The head assembly 17 is periodically urged downwardly by the piston and cylinder devices 19–22, described above. When the phase in the operation is reached in which the frame 87 and associated parts are to move upwardly, the cylinders 21 and 22 are vented to atmosphere to relieve the downward pressure applied to the head assembly 17. The flywheel mechanism then starts the ram R upwardly, which carries with it the drill head DH. After a short upward travel, the nuts 88a on the tie rods 88 abut the upper surface of the drill head DH and thereafter continued upward motion of the drill head DH lifts the head assembly 17 as well.

With the interconnection of the drill head DH and the head assembly 17 described, the sequence of operation is as follows. As the down stroke begins, the head assembly 17 is, in effect, hanging below the drill head DH by means of the tie rods 88 and nuts 88a. The drill head DH and head assembly 17 thus move conjointly during the first portion of the downward stroke. When the phase in the downward stroke is reached in which the floating bushings protruding out of the bottom surface of the head assembly 17 abut the surface of the sheet to be drilled, and the head assembly is urged into tight contact with the sheet by means of the piston and cylinder devices 19–22, further downward motion of the head assembly 17 is prevented. The drill head continues to move downwardly, which motion is guided by the tie rods 88 and the guide posts 18, and the drills pass through the apertures in the head assembly and into the sheet to be drilled.

Attention is now turned to the stop devices 58 and 59 as seen in FIGURES 1, 2 and 7. A plurality of generally L-shaped stop arms 100 are mounted for pivoting motion on a series of pins 101 carried by a cross member 102 supported by the table plate 103. Each of the arms 100 has a pin-and-slot connection 104 with a transversely movable bar 105. The bar 105 is shiftable back and forth to effect extension and retraction of the fingers 100 by means of the downwardly extending arm 106 actuated by the piston and cylinder device 107. As seen in FIGURE 7 in full lines, the piston of the device 107 is moved to the extreme right-hand position and the arms 100 are retracted downwardly out of the path of travel of the board B. As indicated in dot and dash lines in FIGURE 7, the piston of the device 107 in the extreme left-hand position shifts the arm 106 to the position indicated at 106a. As a result, the bar 105 shifts toward the left and the fingers 100 all pivot upwardly. One of the fingers is indicated in the upward position at 108, and in the upward position protrudes into the path of travel of the sheet B. When the fingers 100 are in the upward position they arrest the travel of the board B.

Attention is now directed to an especially important aspect of the present invention, and, for this purpose, attention is directed to FIGURES 3 to 6.

FIGURE 3 illustrates an embodiment of the invention particularly suited for use in situations involving the application of very considerable pressing force urging the head assembly 17 downwardly against the sheet B.

The face plate 85 is carried below the bottom surface of the pressure plate 86 by means of bolts such as 109 which pass upwardly through apertures 110 and 111 in the plates 85 and 86 and cooperate with nuts 112 and lock nuts 112a. The spring 113 abuts washer 114 positioned below the lock nut 112a and, at the other end, abuts the upper surface of the plate 86. The spring is normally maintained in light compression and therefore tends to urge plate 85 toward the bottom surface of plate 86.

Resilient backing means 115 is interposed between the plates 85 and 86. In effect, the resilient backing means 115 comprises elastically yieldable force-transmitting means interposed between the force-generating means above and the floating bushings 116 below. The resilient backing means 115 is composed of a material capable of substantial elastic deformation and which has an elastic yield point well below that of the other parts of the assembly. Preferably the resilient backing means 115 is composed of rubber or a rubber-like material.

The floating bushings 116 comprise sleeve portions 117 adapted to fit within holes 118 through the plate 85. While only one floating bushing 116 is fully illustrated, it is to be understood that a multiplicity of such bushings are provided on closely spaced centers, for example, as indicated by the center lines 119.

At the lower end of the sleeve portion 117 of the bushing 116, ring means 120 is provided, the ring means 120 in the embodiment illustrated taking the form of a tapered axial projecting flange extending downwardly below the lower surface 121 of the plate 85. The ring portion 120 is adapted to indent the upper surface paper 122 on the sheet B.

At the upper end, the floating bushing 116 includes stop means 123 for retaining the bushing against falling downwardly out of the aperture 118. In the form illustrated, the stop means 123 takes the form of a radially projecting annular flange, the lower surface of which abuts the upper surface 124 of the plate 85.

A protective plate 125 may be interposed between the flange 123 and the backing member 115. In applications involving the development of very substantial pressures, it is desirable to include a protective plate 125 in order to minimize wear of the resilient backing member 115. The protective plate 125 must, however, be relatively thin and flexible, within the range of the forces applied, so that it does not significantly interfere with the application through the resilient member 115 of individually yielding downward pressure on each of the multiplicity of floating bushings 116.

Cover plate 99 is preferably provided which shields the equipment thereabove from contact by the debris generated by the drills. The cover plate 99 is provided with a plurality of apertures 98, one such aperture being provided for accommodation of each of the drills D. The cover plate 99 encloses the top of the debris collection chamber 25.

The embodiment of the invention shown in FIG. 3, when in operation, provides for the accommodation of the irregular and unpredictable unevennesses or slight waves in the upper surface of the board B. This is accomplished by the application of the downward force through the resilient backing member 115. The floating bushings of the assembly that happen to come into contact with the board first, that is, those bushings which overlie the hills in the surface of the board, are free during the application of downward pressure on the plate 86, to retreat upwardly slightly into the apertures 118. The resultant upward motion of the flange 123 is accommodated by a slight upward distortion of the protective cover 125 and elastic deformation of that portion of the backing means 115 which immediately surrounds the upper portion of such bushings.

Because of the provision for accommodation upwardly of the floating bushings which first impinge on the hills in the board, further downward motion of the assembly is possible and is effected because of the application of pressure to the plate 86 by the piston and cylinder devices 19–22. The floating bushings which overlie the valleys in the board thus are brought into intimate contact with the board. There results intimate contact by the lower ends of all of the floating bushings against the upper surface of the sheet to be drilled. The tight holding action effectively individually applied around each and every one of the holes to be drilled makes possible a clean aperture-forming operation which results in the formation of an acoustic tile having a multiplicity of clean and sharp apertures.

The embodiment of the invention shown in FIGURE 4 is generally similar to that shown in FIGURE 3. However, the structure at the upper end of the floating bushing 116 is modified. The form of the invention shown in FIGURE 4, and also the form shown in FIGURES 5 and 6, is particularly well suited for applications in which the press force applied is not so large as is involved in the use of the embodiment shown in FIGURE 3. As an indication of the order of magnitude of the pressures involved, it might be mentioned that the embodiments of the invention shown in FIGURES 4 to 6 are particularly well suited for applications involving pressures of from about 5 lbs. to about 15 lbs. per bushing member, whereas the form of the invention shown in FIGURE 3, including the special protective plate 125, is capable of use in applications involving pressures substantially in excess of 15 lbs. per bushing.

In the embodiment of FIGURE 4 the bushing head plate 126 is provided with a multiplicity of apertures 127, each of which apertures accommodates the head 128 of one of the floating bushings 116. If it is desired to guard against any possibility of rotation of the floating bushing 116, the bushing may be keyed to the plate 126, for example by the key 129. The top of the bushing head 128 extends slightly above the upper surface of the bushing head plate 126. With this arrangement, application of downward pressing force to the pressure plate 86 results in forcing the head 128 of the floating bushing to protrude into and elastically deform the backing means 115. The force applied from above is thus directly transmitted to the resilient member 115 and by the resilient member to the multiplicity of bushings 116.

FIGURE 5 shows another embodiment of the invention, prior to the application of assembly force, and FIGURE 6 shows the same embodiment fully assembled.

In FIGURE 5 the resilient backing means, instead of taking the form of the mat or sheet of rubber-like material as at 115 in FIGURES 3 and 4, takes the form of a multiplicity of individual washers or rings 130, with one such washer provided for each of the floating bushings 116. The washers 130 are advantageously formed from the same type of materials as discussed above in connection with the backing sheet 115, that is, rubber or rubber-like materials which are capable of substantial elastic deformation and which have an elastic yield point substantially below that of the surrounding parts.

In the embodiment shown in FIGURES 5 and 6, the bushing head plate 131 is generally similar to the bushing head plate 126 of the embodiment shown in FIGURE 4, except that the plate 131 is relatively somewhat thicker so that the upper surface 132 of the plate is above the top of the floating bushing 116. Before the parts are compressed together, that is, while still in the positions shown in FIGURE 5, each washer 130 abuts the lower surface of the pressure plate 86 and the upper surface of the head 133 on the floating bushing 116. In this position a space 134 exists between the face plate 85 and the pressure plate 86.

When the assembly bolts are screwed up tight, the parts shown in FIGURE 5 assume the positions shown in FIGURE 6. The washer 130 is elastically deformed to a flattened condition indicated in FIGURE 6 at 135. The bottom surface of plate 86 comes into contact with the upper surface 132 of the plate 131 (and also into contact with the upper surface 136 of the face plate 85 around the edges thereof). It is noted that, despite the fact that the plates 85, 86 and 131 are in solid metal-to-metal contact, as shown in FIGURE 6, the force applied to the floating bushings 116 is applied, in effect, individually, because of the resilient nature of the washer 130 interposed between the pressure plate 86 and the head 133 of the bushing. It thus results that each of the multiplicity of bushings is yieldingly urged against the sheet.

As shown in FIGURES 5 and 6, the apertures 137 in the plate 131 may be slightly oversize to accommodate the material of the washer 130 during the elastic deformation and so as to facilitate assembly and disassembly of the bushings. However, it is understood that, if it is desired to prevent rotation of the bushings, this can be accomplished in any convenient manner, for example by means of keyways and keys, as indicated above in connection with the embodiment of FIGURE 4.

Attention is now turned to FIGURES 9 to 11 which indicate the various stages in making acoustic tiles in a typical manufacturing operation according to the invention.

In FIGURE 9 the stops 58 are in the extended position and have arrested the travel of board $B_1$ in a position just below the drill head DH (see FIGURE 1). While the board $B_1$ is in the position shown in FIGURE 9, the drill head makes a downward pass and forms a multiplicity of apertures, such as 138, in the leading portion of the board indicated by the bracket 139. The boards $B_2$, $B_3$ and $B_4$ are in position behind board $B_1$ and are ready to be serially fed through the apparatus.

After the drill head has made a downward pass and drilled holes 138 in the board as shown in FIGURE 9, the stops 58 are retracted, the stops 59 are extended, and the board $B_1$ is advanced against the stops 59 so that the trailing portion, indicated by the bracket 140, is positioned beneath the drill head. The advance of the board $B_1$ to this position is effected by means of pushing from behind by the boards $B_2$, $B_3$, etc., which are urged into the apparatus by means of the input conveyor IC (see FIGURE 1).

When the drill head has completed another pass and drilled holes, such as 141, in the trailing portion 140 of board $B_1$, the stops 59 are retracted, the board $B_1$ is pushed onto the output conveyor OC, the stops 58 are extended, and the travel of board $B_2$ is arrested. The output conveyor OC now takes over the function of advancing the board $B_1$ and removes it from the region of the apparatus while the drilling operations are performed on the board $B_2$ in the same manner as above described in connection with board $B_1$. The speed of the output conveyor OC is conveniently substantially greater than the speed of the input conveyor IC so that the completely drilled boards are rapidly taken out of the way of the incoming boards and of the stops 58 and 59.

FIGURE 12 illustrates a corner of a typical acoustic tile formed according to the invention and having a random pattern of large holes 142 and small holes 143.

From the foregoing it will be seen that the invention makes possible the simultaneous formation of a multiplicity of spaced apertures in a sheet of material, with each aperture being cleanly and sharply formed because the sheet is firmly held around each aperture during the aperture-formation operation. The invention thus provides a method for holding a sheet of material during the simultaneous formation of a multiplicity of apertures therein and also provides equipment with which the method may be performed.

While the invention has been described with special emphasis on its application to the formation of acoustic tile from gypsum board, it is to be understood that the invention is of utility in any gang aperture-forming operation in which it is desirable to tightly hold the surface of the sheet around each of the apertures to be formed.

What is claimed is:

1. Equipment for simultaneously drilling a multiplicity of holes in a sheet of set gypsum comprising bed plate means and head plate means in spaced parallel relation thereto, the head plate means having a multiplicity of apertures therethrough for accommodating a multiplicity of drills extending therethrough in direction toward the bed plate means and the bed plate means having a like number of apertures concentric with the apertures in the head plate means and adapted to accommodate the ends of said drills, the head plate means comprising a pressure plate and a face plate mounted in parallel spaced relation with the face plate nearer said bed plate means, the face plate having, for each aperture therethrough, a bushing member mounted in and extending through the aperture, the bushing members being free for axial movement in the apertures, stop means limiting travel of the bushing members within the apertures in direction toward the bed plate means, and resilient backing means interposed between the bushing members and the pressure plate, said resilient backing means being formed of a material capable of substantial elastic deformation and having an elastic yield point substantially below that of the other parts of the assembly, whereby, when a sheet of set gypsum is interposed between the head plate means and the bed plate means and pressure is applied to the head plate means to urge the pressure plate toward the bed plate means, the bushing members are free to assume individually different axial positions in which that end of each bushing member which is nearest the bed plate means intimately and forcefully contacts the surface of the set gypsum sheet.

2. A construction according to claim 1 in which the resilient backing means comprises a rubber mat.

3. A construction according to claim 1 in which the resilient backing means comprises a multiplicity of individual rubber washers, with one such washer associated with each bushing member.

4. A construction according to claim 1 and further including conveyor means positioned to serially deliver a plurality of sheets of gypsum into drilling position between the head plate means and the bed plate means, and to convey drilled gypsum away from the drilling position, the construction further including a plurality of guide rolls spaced along each side of said conveyor means and adapted to forceably engage opposite edges of the series of sheets of gypsum during travel thereof through the equipment, each such guide roll including a peripheral portion composed of rubber, the guide rolls being mounted for rotation on axes perpendicular to the plane of the series of sheets of gypsum.

5. In equipment for simultaneously drilling a multiplicity of closely spaced holes in a sheet of material, bed plate means for supporting the sheet of material to be drilled and a head assembly mounted in spaced relation to the bed plate means, the head assembly and bed plate means being adapted to accommodate therebetween a sheet of material to be drilled, the head assembly including a multiplicity of drills and a sleeve member for each such drill, the drills being rotatably driven and mounted for conjoint axial travel toward and away from the bed plate means, the sleeve members being mounted for conjoint motion toward and away from the bed plate means between an extended position and a retracted position, the sleeve members in the extended position being individually resiliently urged toward the bed plate means and into tight surface contact with a sheet of material supported by the bed plate means, and means providing for the assumption of the extended position by the sleeve members prior to axial travel of the drills into the sheet of material to be drilled.

6. A construction according to claim 1 and further including a protective plate interposed between said resilient backing means and the bushing members, said protective plate being composed of a material substantially more wear resistant than the resilient backing means and being bendable under the application of pressure to the pressure plate so as to leave the bushing members in freedom to individually assume axial positions in intimate contact with the surface of the gypsum board.

7. Equipment for forming a multiplicity of spaced apertures in a sheet of material comprising, support means for supporting a sheet, a multiplicity of aperture-forming devices mounted for motion toward said support means and adapted to enter and form apertures in a supported sheet, sleeve members equal in number to the number of said aperture-forming devices and mounted in position such that each aperture-forming device passes through a sleeve member before entering a supported sheet to form an aperture, each sleeve member having a bore therethrough of diameter such that the sleeve member closely surrounds the aperture-forming device with which it is associated, pressure means for developing a common force tending to urge all of said sleeve members toward a supported sheet, and pressure-transmitting means between the pressure means and the sleeve members and positioned to transmit the pressure developed by the pressure means to the sleeve members, said pressure-transmitting means being a sheet of material apertured to accommodate all of said sleeve members, which sheet is capable of substantial elastic deformation upon the application of a pressure thereto which is substantially less than that required to deform the rest of the parts of the assembly.

8. Equipment for forming a multiplicity of spaced apertures in a sheet of material comprising, support means for supporting a sheet, a multiplicity of aperture-forming devices mounted for motion toward said support means and adapted to enter and form apertures in a supported sheet, sleeve members equal in number to the number of said aperture-forming devices and mounted in position such that each aperture-forming device passes through a sleeve member before entering a supported sheet to form an aperture, each sleeve member having a bore therethrough of diameter such that the sleeve member closely surrounds the aperture-forming device with which it is associated, pressure means for developing a common force tending to urge all of said sleeve members toward a supported sheet, and pressure-transmitting means between the pressure means and the sleeve members and positioned to transmit the pressure developed by the pressure means to the sleeve members, said pressure-transmitting means comprising washers equal in number to the number of said sleeves and mounted concentrically therewith and being composed of material capable of substantial elastic deformation upon the application of pressure which is substantially less than that required to deform the rest of the parts of the assembly.

References Cited by the Examiner
UNITED STATES PATENTS

| 584,910 | 6/97 | Warner | 144—94 |
|---|---|---|---|
| 2,323,694 | 7/43 | Ward et al. | 144—110 X |
| 2,360,942 | 10/44 | Ellerstein | 77—55 |
| 2,378,618 | 6/45 | Burt | 144—110.1 |
| 2,963,058 | 12/60 | Carlson | 144—110 |

WILLIAM W. DYER, Jr., *Primary Examiner.*

MORRIS M. FRITZ, DONALD R. SCHRAN,
*Examiners.*